United States Patent Office 3,514,363
Patented May 26, 1970

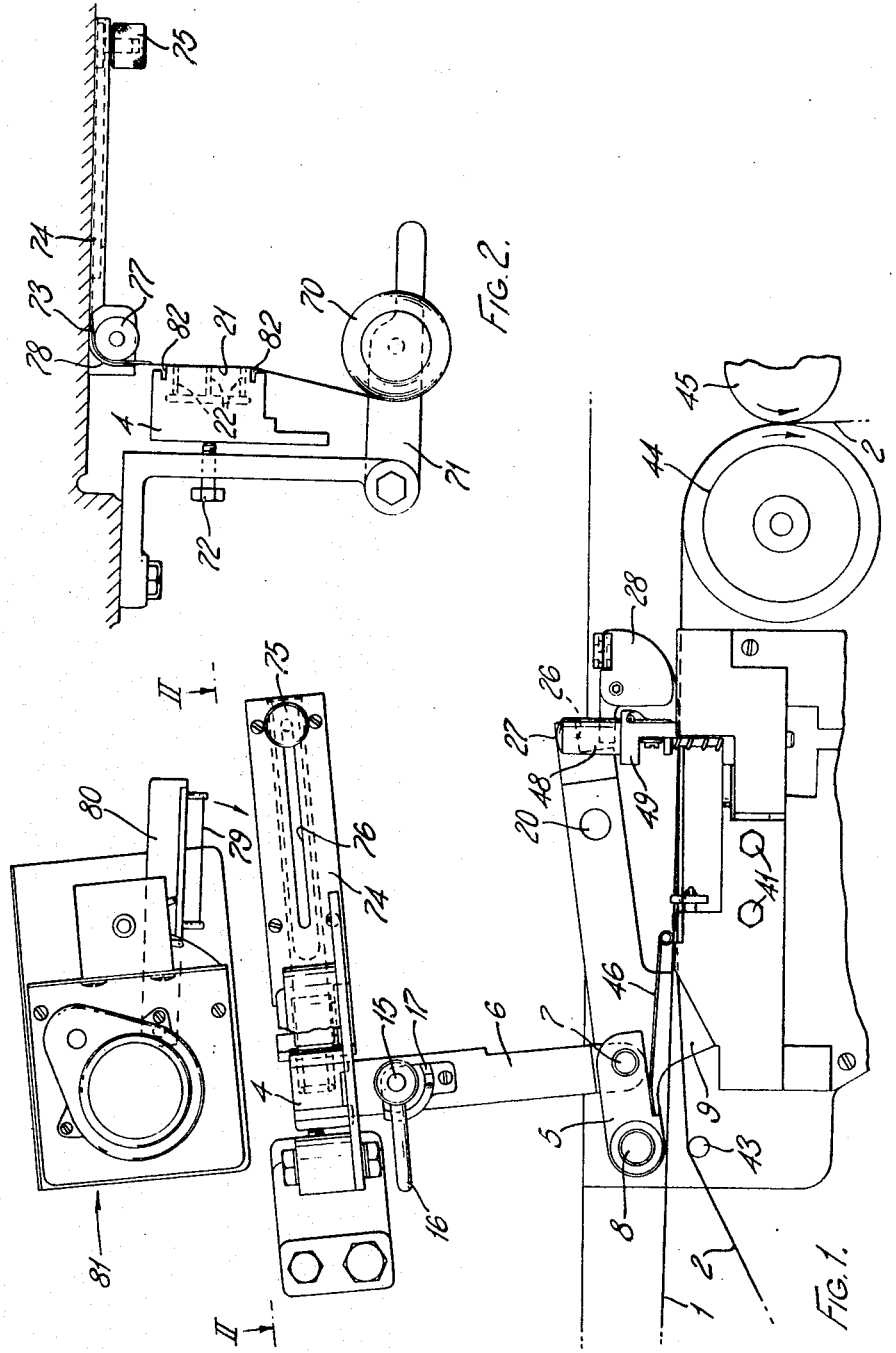

3,514,363
WEB SPLICERS
Horace Alexander Stone and John Charles Raymond, Deptford, London, England, assignors to Molins Machine Company Limited, London, England, a corporation of Great Britain
Filed Aug. 24, 1966, Ser. No. 574,692
Claims priority, application Great Britain, Aug. 25, 1965, 36,555/65
Int. Cl. B31f 5/00
U.S. Cl. 156—505                    19 Claims

ABSTRACT OF THE DISCLOSURE

An apparatus for the butt splicing of two web portions of sheet material. The apparatus initially holds the webs in a longitudinal alignment with the ends of the webs overlapping. A cutting knife cuts transversely through both overlapping webs. The cutting knife is then pivoted parallel to the longitudinal axis of the web, raised again to cutting height and repositioned or pivoted transverse to the webs for future cutting. After the removal of an offcut portion of one of the webs, the webs are secured by an apparatus dispensing a pressure-sensitive tape.

This invention relates to improvements in splicing apparatus for joining two webs of sheet material of the type in which a cut is made through one of the webs and the other web is joined to one of the cut parts of the first web. The invention is particularly although not exclusively concerned with splicing apparatus for joining the web of a new reel of sheet material onto the running web of an expiring reel of material.

In one method of splicing a new web onto an expiring web the webs are positioned together; a knife cuts through both webs at the same time; the offcut of the incoming web is removed and adhesive tape is applied across the cut to join the incoming web to the trailing edge of the running web. It is important that the joint should be formed as neatly as possible with the edges of the two webs neatly abutting each other without a gap. Frequently, a poor joint has been produced by known splicing apparatus because the cut edges of the two webs lose their alignment during the time that the offcut and the knife are being removed and the tape is being brought into position. In some applications of splicing apparatus used, it is necessary that the apparatus should be capable of accepting and satisfactorily splicing materials of different thicknesses.

It is an object of this invention to provide an improved splicing apparatus for joining two webs of sheet material which produces an improved joint. It is another object to provide an improved splicing apparatus for joining two webs of sheet material which is capable of satisfactorily splicing different thicknesses of material.

A further object of the invention is the provision of splicing apparatus in which two superimposed webs are cut, an offcut of one of the webs is immediately moved away from the cut, and an adhesive tape is immediately thereafter pressed on to abutting parts of the two webs to be joined.

A still further object of the invention is to provide an improved means of separating a desired length from a strip of adhesive material to provide a joining tape.

A further object is to provide in a splicing apparatus a mechanism for removing an offcut from a web immediately after the cut, comprising a pivoted member to which an end of a new web is attached, the member being swung about its pivot, immediately after the cut, in a direction such as to pull the offcut away from the cutting position.

Figure 3:
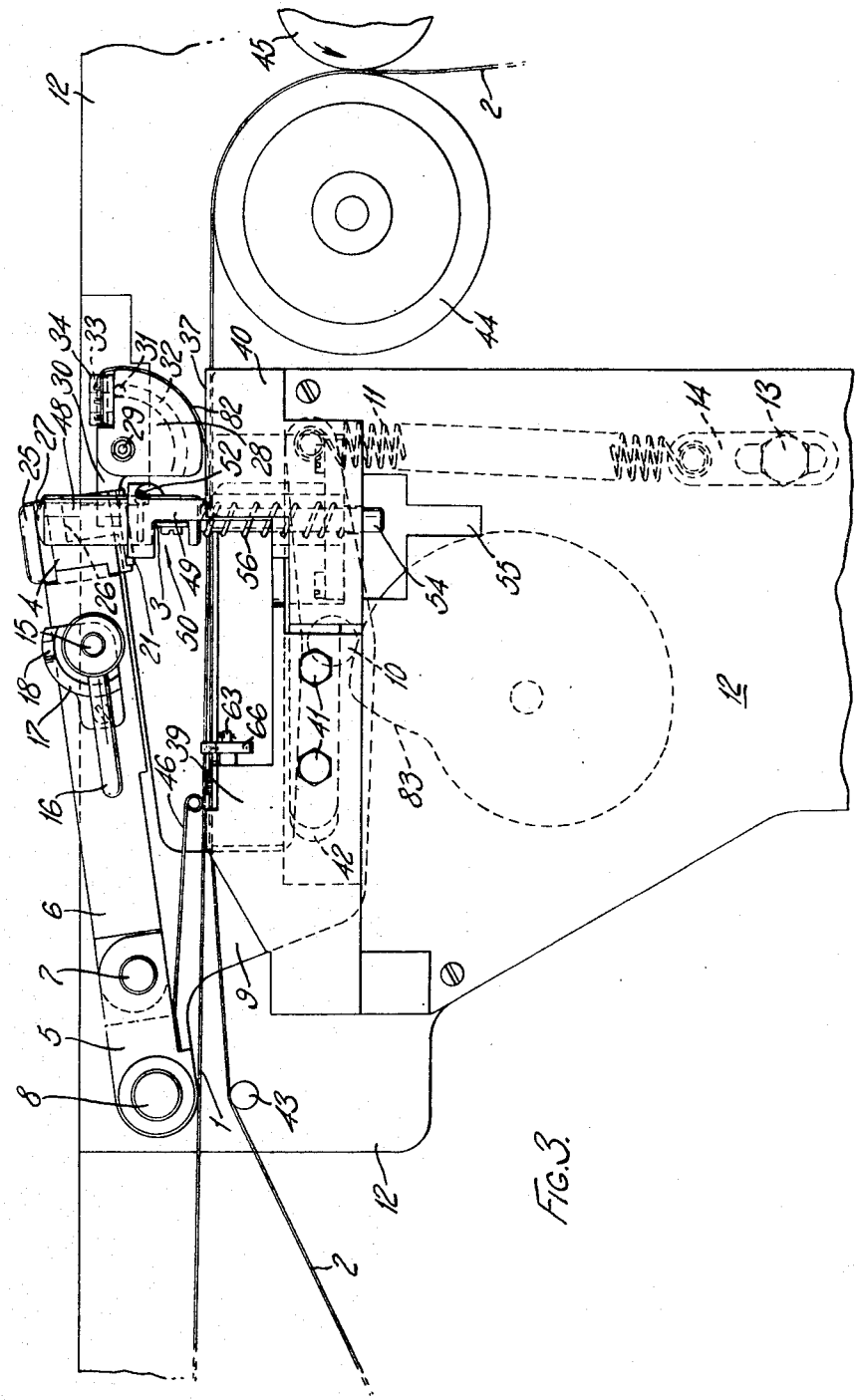
Figure 4:
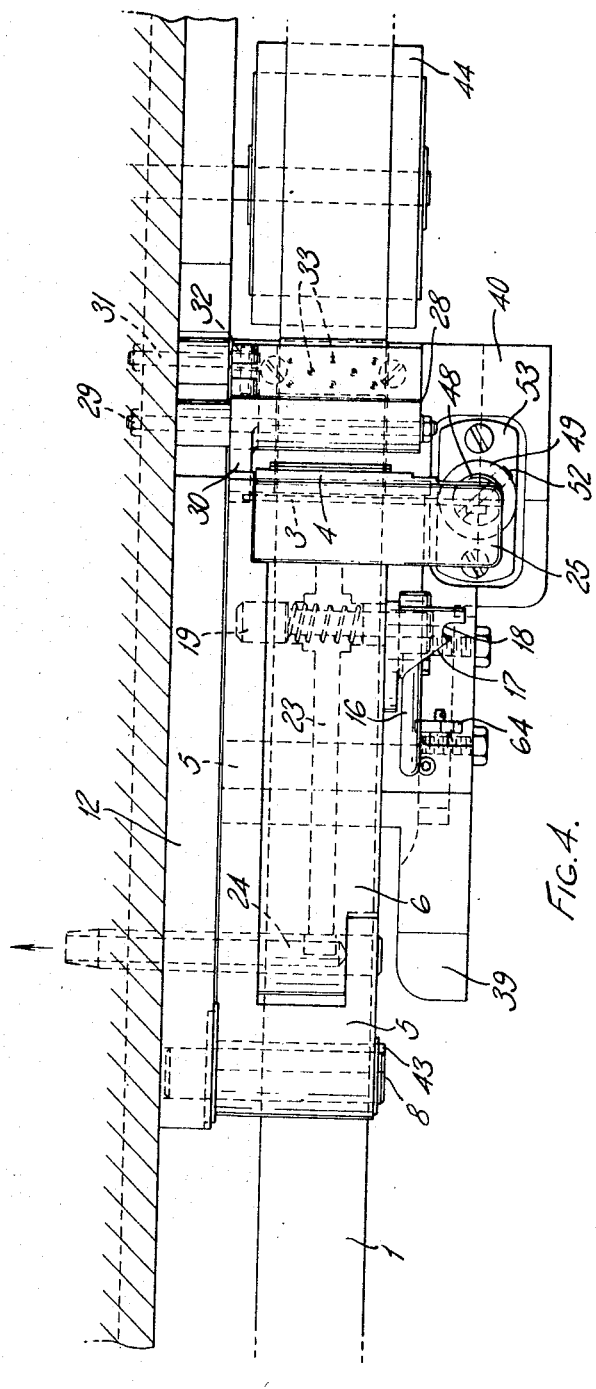
Figure 5:
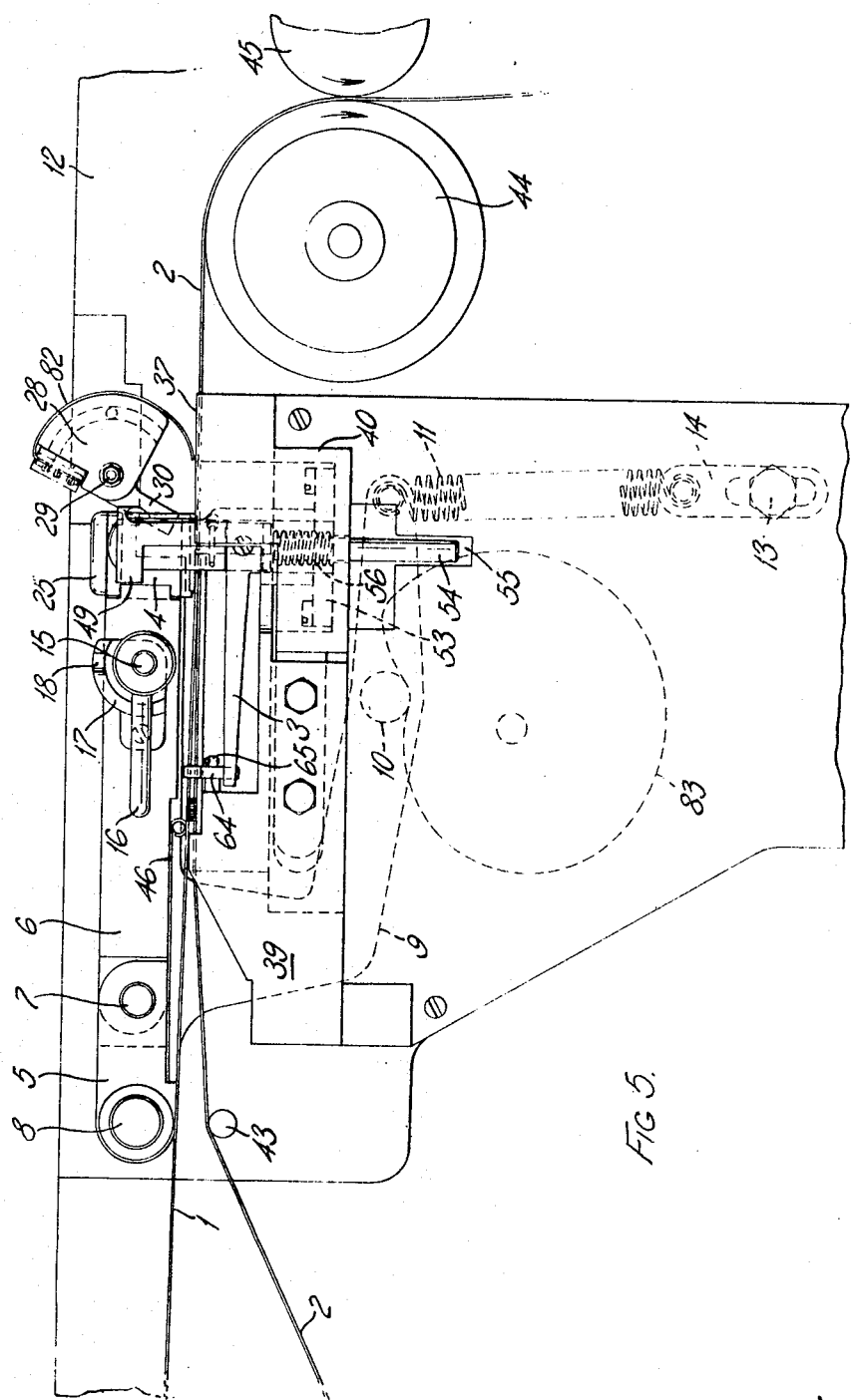
Figure 6:
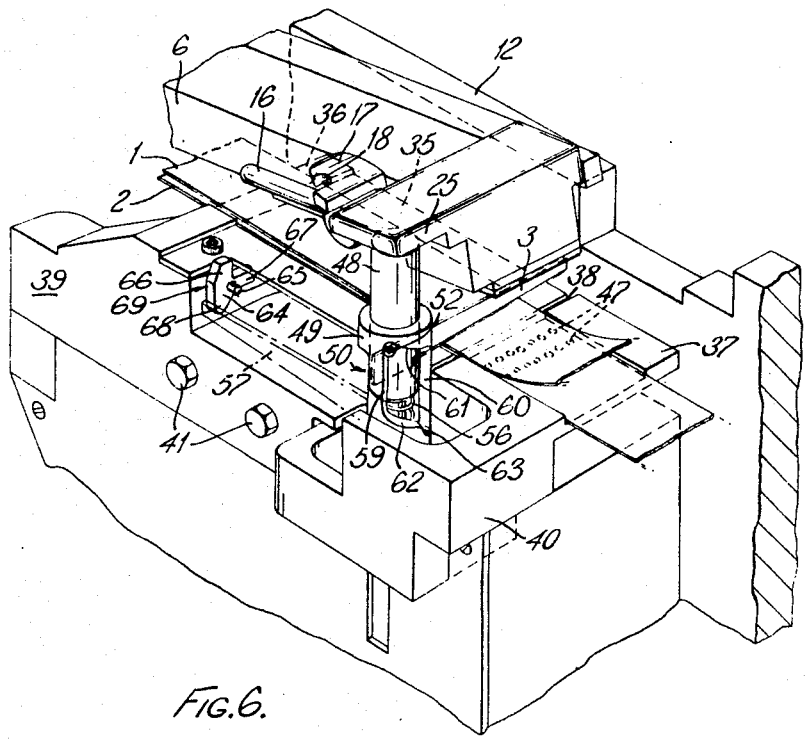
Figure 7:
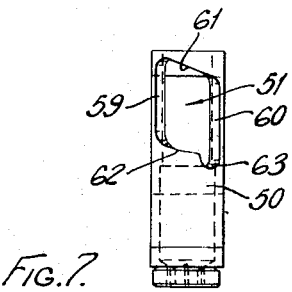

Apparatus in accordance with the invention will now be described by way of example with reference to the seven figures of the accompanying drawings in which:

FIG. 1 is a front elevational view of a butt-splicing apparatus which includes a tape applicator, FIG. 2 is a plan view of the tape applicator, taken on the line II—II, FIG. 1, FIG. 3 is a view similar to FIG. 1 showing more details of a part of the apparatus of FIG. 1 with some of the apparatus in different positions, FIG. 4 is a plan view of FIG. 3, FIG. 5 is a view similar to FIG. 3 but with the parts of the apparatus in further different positions, FIG. 6 is a perspective view of a part of the apparatus of FIG. 3; and FIG. 7 is a detail view of a component of the apparatus of FIG. 6.

Referring to the drawings, there is shown butt-splicing apparatus in different stages of the operation of splicing a web 1 from a new reel of strip material onto the running web 2 (which is held staationary during the splicing operation) of an expiring reel of strip material.

During the splicing operation the splicing apparatus performs the steps of cutting through both webs, removing the offcut from the leading end of the new web 1, applying a strip of tape across the joint from the new leading end of the web 1, to the now trailing end of the web 2 and drawing the spliced webs away from the leading end of the remainder of the web 2.

The construction of the apparatus will now be described. The butt-splicing apparatus shown comprises a knife 3 (FIG. 6) mounted to be moved downwardly through the webs to cut them and to be retracted around the webs so that its path of movement in retraction does not intersect them. A tape applicator, which is shown generally in the upper part of FIG. 1, includes a taping head 4 by means of which a strip of adhesive tape is applied across the cut webs.

The tape applicator (see FIGS. 1, 3 and 4) comprises a bifurcated arm 5, one prong 6 of which is pivoted at 7, which is pivotally mounted at 8 for vertical movement on to and away from the webs 1 and 2. A cranked cam arm 9 is formed integrally with the arm 5 to extend therebelow and to control the movement of the arm 5 about the pivot 8. Arm 9 is provided with a cam follower 10 and is connected at its end to one end of a tension spring 11, the other end of which is adjustably mounted on the back plate 12 of the splicing apparatus by means of a bolt 13 and a slotted plate 14. Tension spring 11 acts to urge the follower 10 into engagement with the timing cam 83 mounted below the plane of the webs 1 and 2. As the cam rotates in a clockwise direction from the position shown in FIG. 3, spring 11 rapidly lowers cam arm 9 and thence the taping arm 5 to bring the latter down towards the webs and the cam then gradually returns them to their raised position. The rotation of cam 83 is timed according to the quantity of material left on the reel from which the web 2 is drawn. Pivoted prong 6 carries a locking device comprising a spring bolt 15 operated by rotation of a handle 16, which rides on a cam face 17, between the positions shown in FIGS. 1 and 3, in the former of which it engages in the notch 18 which is formed at the high point of cam 17. In the position shown in FIG. 3 the end 19 (FIG. 4) of spring bolt 15 is engaged within a socket 20 (see FIG. 1) formed in the fixed prong of arm 5 in which position the pivoted prong 6 is locked against pivoting. In the position shown in FIG. 1 spring bolt 15 is held clear of the socket 20 so that prong 6 is free to swing about pivot 7. At the free end of prong 6 is mounted a taping head 4 which has a flat tape face 21 formed to extend radially of the pivot 7 and into which open suction ports 22 connected to a source of suction by way of ducts 23 and 24 formed through the prong 6 and the pivot 7, respectively. Remote from the tape face 21 the taping head 4 is formed with a lug constituting a hammer 25 which is used to actuate the movement of the knife 3 in a manner to be described later. The end of the fixed prong of the operating arm 5 is undercut at 26 to provide a striker 27 which operates to actuate a removal device for the offcut of the web 1. This removal device comprises a quadrant piece 28 pivotally mounted at 29, its angular position about the pivot being determined by a rearwardly extending tail 30 which engages in the recess 26 in the fixed prong of operating arm 5 and by the position of a stop 31 in a guide groove 32. The leading end of web 1 is fed under the quadrant member 28 to the outer corner thereof where it is secured over needles 33 by a pivoted clamping piece 34.

Webs 1 and 2 are suppported for splicing on a splicing table having a first leaf 35 formed with a guide 36 to position the webs and having a second leaf 37 which is recessed to guide the webs and which is spaced apart from leaf 35 to define a slot 38 to receive knife 3 (see FIG. 6). The edge of the leaf 35 at the slot 38 is formed to constitute a counterknife to the knife 3 and the two table leaves 35 and 37 are carried on housings respectively 39 and 40 of which the latter housing 40 also carries the knife support. The relative positions of the housings 39 and 40 and thence the breadth of the slot 38 and the setting of the knife 3 and the counterknife, are adjustable by means of bolts 41 and slots 42, FIG. 3. Web 2 is drawn over a lead roller 43 by a pair of rollers 44 and 45 of which roller 44 is a positively driven roller and roller 45 is a free-running roller which is urged to press the web into engagement with roller 44. Control spring 46 is provided to assist in the positioning of the incoming web 1.

Into the surface of leaf 37 over which the webs pass open suction ports 47 connected to a source of suction which is controlled to hold the webs in position during splicing.

Knife 3 is supported at one end on a cylindrical plunger 48 which is slidable and rotatable in a tubular sleeve 49. Sleeve 49 is formed with two apertures (FIGS. 6 and 7), the first aperture 50 of which is a 180° cut away from part of the length of sleeve 49 through which the knife 3 projects for rotational and up and down movement with the plunger 48. A second aperture 51 is formed so that its periphery constitutes a cam face for a follower roller 52 secured to the shaft of plunger 48 to guide the movement thereof and thence to determine the position of the knife 3. The tubular sleeve 49 is flanged at its lower end 53 and bolted to the housing 40. Plunger 48 has a downwardly extending shaft portion 54 (FIG. 5) which is guided in a socket 55 formed in the housing 40. A compression spring 56 is secured between the extension 54 of the plunger 48 and the sleeve 49 to urge plunger 48 (and thence knife 3) upwardly and it is also secured to have a torsional stress so as to urge plunger 48 to rotate in a direction to move knife 3 from a position 57 shown in chain lines (FIG. 6) at the side of the web to the full line position in FIG. 6. At the same time the spring 56 urges the follower roller 52 on the plunger 48 into engagement with the cam face defined by the aperture 51 in the sleeve 49. This cam face has the general shape of a parallelogram with two axially extending portions 59 and 60 joined at their ends by portions 61 and 62 which each drop down towards the spring 56 from the end of portion 59 to that of 60. At the junction of portions 60 and 62 a small well 63 is formed to prevent the follower roller 52 jarring as it reaches this point.

A stop in the form of a pawl 64 is mounted to engage the free end of the knife 3 in chain line position 57, FIG. 6, and is rotatably mounted on the housing 39 at 65, to have perpendicularly disposed arms 66 and 67 embracing the edge of leaf 35, which acts as a stop, setting limits on the rotation of pawl 64. A third arm 68 extends radially downwardly away from the arms 66 and 67 and is formed with a guide face 69.

As the plunger 48 is depressed the follower 52 moves down cam face 59, and the knife 3 moves vertically downward into slot 38 between table leaves 35 and 37, cutting through the webs 1 and 2. Then the follower roller 52 engages the lower cam face 62, whereupon the knife starts to swing towards position 57. From this position, if the plunger 48 is released, the spring 56 acts to move the plunger and the knife upwardly, the upward movement being guided by the engagement of the knife 3 with the guide face 69 on pawl 64 and by the engagement of roller 52 with cam face 60, thereby ensuring that the knife 3 does not swing across and foul the webs 1 and 2. Once the roller 52 is at the top of cam path 60 and the knife 3 is clear of the pawl 64, the compression and torsion in spring 56 act to swing knife 3 across the webs into the full line position of FIG. 6, under the control of the movement of roller 52 along cam surface 61.

The taping head 4 is charged with a strip of single-sided pressure-sensitive adhesive cellophane tape such as Sellotape (registered trademark) by means of the tape applicator, shown in FIGS. 1 and 2, which is disposed immediately above the webs 1 and 2 to co-operate with the arm 6 in its uppermost position. The tape applicator comprises a reel of Sellotape 70 mounted on a bracket 71 which also carries a stop 72 which is engaged by the taping head 4 to lcoate it in position when the prong 6 is raised. Sellotape is drawn across taping head 4 by means of a spring steel strip 73 which is constrained to move within a slide 74 and which is provided at one end with an operating knob 75 projecting through a slot 76 in slide 74, and which at its other end extends between a roller 77 and a guide plate 78 to be turned through 90°. It will be seen that the effect of this arrangement is that as the knob 75 is moved up and down the slot 76, the free end of the spring steel strip 73 moves across the taping head 4 and can be used to draw Sellotape from the reel 70 across the face 21 of taping head 4. A tape cutter is disposed immediately above the parts just described and comprises a knife having two cutting blades in the form of two spaced apart and electrically heated wires 79 mounted to swing on a knife arm 80. The timing and movement of the knife and of the heating of wires 79 are controlled by an electromechanical timer indicated generally at 81. This knife can swing downwardly so that the heated wires 79 engage and melt the Sellotape on either side of the tape face 21 thus cutting it at these points. Slots 82 are provided in the tape head 4 at this position to accommodate the knife wires 79 in their followthrough.

The operation of the apparatus will now be described. The web 2 is fed out between rollers 44 and 45 into a web accumulator and then to processing machinery to which it is supplied continuously. The web accumulator, which is not shown, operates to provide a reservoir of material so that the output from the accumulator can be maintained continuously in spite of variations which may occur in the supply speed from the reels, and also and more importantly, so that the supply can be maintained throughout the splicing operation during which the webs are held stationary in the splicing apparatus. As a feeler gauge on the reel from which the web 2 is running out indicates that the web is expiring, the speed at which the web is fed into the accumulator through the rollers 44 and 45 is increased to build up a reservoir of material in the accumulator. At the same time web 1 from a new reel is fed by the operator under the spring 46 on to the splicing table, under the knife 3 and around the quadrant piece 28 and the end is secured on a needle 33 by means of clamp 34. Meanwhile the operator charges the taping head 4 with a length of Sellotape by raising the prong 6 to the position shown in FIG. 1 by sliding the operating knob 75 to the end of the slot 76 to move the strip 73 out across taping head 4. It is to be noted at this point that the effect of the guide 78 and the roller 77 on the spring strip 73 is to displace the strip 73 not only across the tape face 21 but also away therefrom. It is thus conveniently positioned for the operator to stick a leading portion of the tape from the reel to the strip 73 with the adhesive side facing away from the taping head 4. He then draws operating knob 75 back down slide 74 thus pulling the strip 73 back into the slide and drawing the Sellotape 70 across and into engagement with the taping head 4. He now operates a control switch on the program timer 81 which actuates the knife moving mechanism to swing the knife down, at the same time heating the two knife wires 79, to bring the wires 79 into engagement with the Sellotape 70, which is stretched across the head 4 as shown in FIG. 2, whereupon the wires cut through the Sellotape by melting it, and are then accommodated in slots 82. Immediately after the cut the timing mechanism returns the knife arm 80 to the position shown in FIG. 1. The taping head 4 is now loaded and ready for use, the tape being held in position by suction through the ports 22. It is therefore swung down to the position shown in FIG. 3, and the handle 16 is moved round cam 17 to bring spring bolt 15 into engagement with socket 20 to lock prong 6 in position with operating arm 5. Running web 2 is stopped and is held in position by means of suction applied through ports 47 in table leaf 37. Everything is now prepared for the splicing operation itself. It will be appreciated that, within limits, considerable time may be taken in carrying out the steps of preparation which have so far been described, but that once the running web 2 has been stopped and the processing machinery is being fed solely from the web accumulator, it is essential, since the reservoir capacity of this accumulator is strictly limited, that the splicing operation should be carried out rapidly and the web should be started in motion to continue the supply of material from the new reel before the web reservoir is exhausted.

At this moment cam 83 is in the position shown in FIG. 3 and to carry out the splicing it is advanced rapidly in a clockwise direction, in synchronism with the stopping of the web 2, whereupon follower 10 drops down into the well in the face of cam 83 and cam arm 9 is drawn rapidly downwards by tension spring 11. Operating arm 5 together with prong 6 is also pulled downwards and hammer head 25 engages plunger 48 to commence the operation of the knife which travels downwards (follower roller 52 following along cam surface 59) and cuts through the webs 1 and 2. At the moment of cutting, the striker 27 engages extension 30 of the offcut removal device, pivoting the quadrant member 28 about pivot 29, and drawing the offcut 82 of web 2 cleanly away from the cutting zone. Taping head 4 follows very closely behind the knife 3 and as soon as the webs have been cut and the offcut 82 has been removed, the adhesive tape which has been applied to the tape surface 21 is brought squarely down across the cut, joining the new leading edge of the web 1 with the trailing edge of the web 2 across the cut. Meanwhile the knife 3 continues its path of movement, according to the position of roller 52 on its cam face, to be guided up through the plane of the webs by the pawl 64 and to be brought back to arrive in its starting position when the splicing has been completed and the operating arm returned to its original position. When the tape has been applied cam 15 continues to rotate and forces follower 10 upwards, thereby withdrawing the head 4 from the webs and returning it to its original position. As soon as the taping head is clear of the web the rollers 44 and 45 are restarted and the feed from a new reel into the accumulator commences, the rate of feed being adjusted according to the amount of material remaining in the accumulator.

What we claim as our invention and desire to secure by Letters Patent is:

1. Splicing apparatus for joining two webs of sheet material comprising means to support one of the webs for splicing; a cutting mechanism including a knife; means to move the knife to cut the supported web and to retract the knife around the cut web, the knife-moving means comprising a shaft connected to one end of and supporting the knife and mounted adjacent to the web support for swinging the knife between a position in which it extends transversely across the web to a position alongside the web; a tubular sleeve in which said shaft is mounted for rotary and axial movement whereby the path of movement of the knife during retraction does not intersect the web, said tubular sleeve including an aperture in its tubular wall, the peripheral edge of said aperture constituting a cam face and having a shape corresponding with said path of movement of the knife, a cam follower mounted on the shaft and extending into said aperture, and means to urge the follower into engagement with the cam face; and means to join the other web to one of the parts of the cut web.

2. Splicing apparatus according to claim 1 comprising a plunger constituting an extension of the shaft out of the sleeve and wherein said means to urge the follower comprises a helical spring connected with said shaft in a state of compression and torsion.

3. Splicing apparatus according to claim 2 wherein said web-supporting means comprises a web supporting surface the knife being disposed to cut downwardly through the web which apparatus comprises a pawl disposed below said surface to be engaged by the knife during retraction, and a knife guide disposed on the pawl to guide the knife above said surface.

4. Splicing apparatus according to claim 3, wherein said pawl is pivotally mounted and comprises two pawl arms, a stop embraced by said pawl arms and a third pawl arm remote from said stop, said knife guide extending between said third pawl arm and one of said two pawl arms.

5. Splicing apparatus according to claim 1 wherein the cam face comprises first and second axially extending parts the second part being angularly and axially displaced from the first part, and third and fourth parts connecting the first and second parts.

6. Splicing apparatus for joining two webs of sheet material comprising means to support the webs for splicing, means to simultaneously cut both the supported webs, offcut removal means to remove the offcut from one of the webs, web-joining means movable into engagement with the cut webs, and means to actuate firstly said cutting means, secondly said removal means, and thirdly said web-joining means.

7. Splicing apparatus according to claim 6 wherein the cutting means comprises a knife and means to move the knife to simultaneously cut both the supported webs and to retract the knife around the cut web, the path of movement of the knife in retraction not intersecting the web.

8. Splicing apparatus according to claim 6, wherein said offcut removal means comprises a member pivotally mounted intermediately of its length above the webs, and having at one end means to hold that part of a web which will be an offcut after the web is cut, the other end of said member being disposed to be engaged and moved by part of said joining means when the latter moves towards the webs, whereby the member is swung about its pivot immediately after the webs are cut and pulls the offcut away from the cutting position before the webs are joined.

9. Splicing apparatus for joining two webs of sheet material comprising means to support the webs for splicing, means to cut the supported webs, offcut removal means to remove the offcut from one of the webs, web-joining means movable into engagement with the cut webs comprising a taping head for supporting a piece of adhesive tape, a pivoted arm carrying said taping head, a follower connected with said pivoted arm, a timing cam disposed to be engaged by the follower and rotation of which causes said arm to pivot, means to urge the follower into engagement with the cam, and means to actuate firstly said cutting means, secondly said removal means, and thirdly said web-joining means.

10. Splicing apparatus according to claim 9 wherein said pivoted arm is bifurated having a pivoted prong carrying the taping head and having a releasable locking device to lock said prong against pivoting.

11. Splicing apparatus according to claim 10 comprising suction ports opening into said taping head, and ducts connecting said parts with a suction source for supporting said piece of adhesive tape against said taping head.

12. Splicing apparatus for joining two webs of sheet material comprising means to support the webs for splicing; means to cut the supported webs comprising a knife and means to move the knife to cut the supported webs and to retract the knife around the cut web, the path of movement of the knife in retraction not intersecting the web, said means to move the knife comprising a plunger depressible to actuate cutting of the webs, offcut removal means to remove the offcut from one of the webs, and web-joining means movable into engagement with the cut webs comprising a hammer to engage and depress said plunger; and means to actuate firstly said cutting means, secondly said removal means, and thirdly said web-joining means.

13. Splicing apparatus according to claim 12 wherein said knife-moving means further comprises a shaft connected to one end of and supporting the knife and mounted to swing the knife between a position in which it extends transversely across the webs and a position alongside the webs, a tubular sleeve in which said shaft is mounted for rotary and axial movement, an extension of the shaft out of the sleeve constituting said plunger, means to urge said plunger out of the sleeve following depression thereof, and stop means limiting the displacement of the plunger out of the sleeve.

14. Splicing apparatus according to claim 12 comprising an aperture in said tubular sleeve, a cam face defined by the peripheral edge of said aperture having a shape corresponding with said path of movement of the knife, and a follower mounted on the shaft extending into said aperture for engagement with said cam face and wherein said plunger urging means comprises a helical spring connected to said shaft in a state of compression and of torsion to urge the follower into engagement with said cam face.

15. Splicing apparatus for joining two webs of sheet material comprising means to support the webs for splicing, means to cut the supported webs, offcut removal means to remove the offcut from one of the webs, web-joining means movable into engagement with the cut webs, and means to actuate firstly said cutting means, secondly said removal means, and hirdly said web-joining means, said offcut removal means comprising a member pivotally mounted intermediately of its length above the webs and having at one end means to hold that part of a web which will be an offcut after the web is cut, the other end of said member being disposed to be engaged and moved by part of said joining means when the latter moves towards the webs, whereby the member is swung about its pivot immediately after the webs are cut and pulls the offcut away from the cutting position before the webs are joined.

16. Splicing apparatus according to claim 15 wherein said offcut removal means comprises a quadrant piece carried on said member and having its apex on the axis of pivoting of said member.

17. Splicing apparatus for joining two webs by an adhesive strip, comprising means to support a first web, means to hold a second web disposed adjacent the first web, cutting means to simultaneously cut through both the webs, removal means to remove the severed leading end part of the second web, and joining means to apply a joining tape to the first and second webs at both sides of the cut, said joining means being carried by a member arranged to be moved towards the webs and during said movement to actuate the cutting means and then the removal means before applying the joining tape to the webs.

18. Splicing apparatus for joining two webs of sheet material comprising means to support one of the webs for splicing, a cutting mechanism including an elongated knife, means to move the knife to cut the supported web and to retract the knife around the cut web, the knife-moving means comprising a shaft connected to one end and supporting the knife and mounted adjacent to the web support for swinging the knife between a position in which it extends transversely across the web to a second position alongside and generally parallel to the web, means mounting said shaft so as to permit rotary and axial movement thereof, means guiding said knife into said second position during retraction so that the path of the knife does not intersect the web, and means to join the other web to one of the parts of the cut web.

19. Splicing apparatus for joining two webs of sheet material comprising means to support one of the webs for splicing, a cutting mechanism including a knife, means to move the knife to cut the supported web and to retract the knife around the cut web, the path of movement of the knife in retraction not intersecting the web, and means to join the other web to one of the parts of the cut web, said web-supporting means comprising a table having a first leaf constituting a counter knife and a second leaf carrying the cutting mechanism and adjustable relative to the first leaf, said counter knife and said second leaf defining between them a slot the width of which can be varied by relative adjustment of the leaves.

References Cited

UNITED STATES PATENTS

| 3,121,361 | 2/1964 | Kramer | 83—564 X |
|---|---|---|---|
| 3,245,861 | 4/1966 | Roshkind | 156—505 |

ROBERT F. STAHL, Primary Examiner

U.S. Cl. X.R.

83—171, 564; 242—58.1